US006845473B2

(12) United States Patent
Ko et al.

(10) Patent No.: US 6,845,473 B2
(45) Date of Patent: Jan. 18, 2005

(54) METHOD OF VERIFYING DEFECT MANAGEMENT AREA INFORMATION OF OPTICAL DISC

(75) Inventors: Jung-wan Ko, Yongin (KR); Hyun-kwon Chung, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 09/805,443

(22) Filed: Mar. 14, 2001

(65) Prior Publication Data

US 2001/0033537 A1 Oct. 25, 2001

Related U.S. Application Data

(60) Provisional application No. 60/195,467, filed on Apr. 10, 2000.

(30) Foreign Application Priority Data

Apr. 8, 2000 (KR) ........................................ 2000-18508

(51) Int. Cl.[7] ................................................ G06F 11/00
(52) U.S. Cl. ..................... 714/42; 369/53.1; 369/53.12; 369/53.15; 369/53.44
(58) Field of Search .................. 714/42, 25; 369/47.14, 369/53.13, 53.31, 53.12, 53.44, 53.1, 53.15; 360/31

(56) References Cited

U.S. PATENT DOCUMENTS

| | | | | | |
|---|---|---|---|---|---|
| 4,631,723 | A | * | 12/1986 | Rathbun et al. | 714/710 |
| 5,568,454 | A | * | 10/1996 | Shima et al. | 369/13.28 |
| 5,966,358 | A | * | 10/1999 | Mine | 369/47.14 |
| 6,088,664 | A | * | 7/2000 | MacPherson | 702/183 |
| 6,119,239 | A | * | 9/2000 | Fujii | 713/320 |
| 6,154,858 | A | * | 11/2000 | Ottesen et al. | 714/42 |
| 6,467,054 | B1 | * | 10/2002 | Lenny | 714/42 |
| 6,526,522 | B1 | * | 2/2003 | Park et al. | 714/8 |
| 6,542,450 | B1 | * | 4/2003 | Park | 369/53.15 |
| 6,601,201 | B1 | * | 7/2003 | Kato | 714/724 |
| 2003/0133379 | A1 | * | 7/2003 | Shin | 369/53.17 |
| 2003/0135800 | A1 | * | 7/2003 | Kim et al. | 714/719 |

FOREIGN PATENT DOCUMENTS

| | | |
|---|---|---|
| JP | 55-64660 | 5/1980 |
| JP | 03-016025 | 1/1991 |
| JP | 05-307836 | 11/1993 |
| JP | 10-144011 | 5/1998 |

OTHER PUBLICATIONS

OSTA.MultiRead2: Test Plan for MultiRead2. Dec. 6, 1999. pp. 1–14.*
U.S. patent application Ser. No. 09/805,437, Jung Wan Ko et al., filed Mar. 14, 2001, Samsung Electronics Co. Ltd.
U.S. patent application Ser. No. 09/805,436, Jung Wan Ko et al., filed Mar. 14, 2001, Samsung Electronics Co., Ltd.
U.S. patent application Ser. No. 09/805,446, Jung Wan Ko et al., filed Mar. 14, 2001, Samsung Electronics Co., Ltd.

(List continued on next page.)

*Primary Examiner*—Robert Beausoliel
*Assistant Examiner*—Yolanda L Wilson
(74) *Attorney, Agent, or Firm*—Staas & Halsey LLP

(57) ABSTRACT

A method of verifying the defect management area (DMA) information of an optical disc. The method verifies that DMA information is properly generated or updated after a recording and reproducing apparatus, which records or reproduces information on or from an optical disc with DMA information, performs a process in a test mode for testing the generation or update of DMA information. The method includes reading the generated or updated DMA information and verifying the generated or updated DMA information using reference DMA information which is predetermined for the test mode and providing the verified result. Accordingly, it is easily verified that the recording and reproducing apparatus exactly generates or updates defect information by performing various test modes using different test discs having predetermined defect information, which has no relation with actual defects, instead of using a disc having the actual defects.

35 Claims, 9 Drawing Sheets

OTHER PUBLICATIONS

U.S. patent application Ser. No. 09/805,447, Jung Wan Ko et al., filed Mar. 14, 2001, Samsung Electronics Co., Ltd.

U.S. patent application Ser. No. 09/805,439, Jung Wan Ko et al., filed Mar. 14, 2001, Samsung Electronics Co., Ltd.

U.S. patent application Ser. No. 09/805,438, Jung Wan Ko et al., filed Mar. 14, 2001, Samsung Electronics Co., Ltd.

U.S. patent application Ser. No. 09/805,448, Jung Wan Ko et al., filed Mar. 14, 2001, Samsung Electronics Co., Ltd.

U.S. patent application Ser. No. 09/805,444, Jung Wan Ko et al., filed Mar. 14, 2001, Samsung Electronics Co., Ltd.

* cited by examiner

FIG. 1

| Class | Items | | Byte Position | of bytes | Expected value |
|---|---|---|---|---|---|
| DMA | Error condition of DMA | DMA1 | NA | NA | No uncorrectable error |
| | | DMA2 | NA | NA | No uncorrectable error |
| | | DMA3 | NA | NA | No uncorrectable error |
| | | DMA4 | NA | NA | No uncorrectable error |
| | DDS/PDL and SDL Update counters | DDS/PDL update counter in DDS1 | 4 to 7 | 4 | M+k |
| | | DDS/PDL update counter in SDL1 | 16 to 19 | 4 | M+k |
| | | DDS/PDL update counter in DDS2 | 4 to 7 | 4 | M+k |
| | | DDS/PDL update counter in SDL2 | 16 to 19 | 4 | M+k |
| | | DDS/PDL update counter in DDS3 | 4 to 7 | 4 | M+k |
| | | DDS/PDL update counter in SDL3 | 16 to 19 | 4 | M+k |
| | | DDS/PDL update counter in DDS4 | 4 to 7 | 4 | M+k |
| | | DDS/PDL update counter in SDL4 | 16 to 19 | 4 | M+k |
| | | SDL update counter in SDL1 | 4 to 7 | 4 | N+k |
| | | SDL update counter in SDL2 | 4 to 7 | 4 | N+k |
| | | SDL update counter in SDL3 | 4 to 7 | 4 | N+k |
| | | SDL update counter in SDL4 | 4 to 7 | 4 | N+k |
| | Contents of DMA | DMA1 | NA | | Should be identical |
| | | DMA2 | NA | | Should be identical |
| | | DMA3 | NA | | Should be identical |
| | | DMA4 | NA | | Should be identical |

FIG. 2

| Class | Items | | Byte Position | of bytes | Expected value | |
|---|---|---|---|---|---|---|
| DDS | DDS Identifier | | 0 to 1 | 2 | 0A0Ah | |
| | reserved | | 2 | 1 | 00h | |
| | Disc Certification flag | | 3 | 1 | b7 | 0b |
| | | | | | b6-b2 | All 0b |
| | | | | | b1 | X |
| | | | | | b0 | X |
| | DDS/PDL update counter | | 4 to 7 | 4 | M+k | |
| | Number of Groups | | 8 to 9 | 2 | 0001h | |
| | Number of zones | | 10 to 11 | 2 | 0023h | |
| | reserved | | 12 to 79 | 68 | All 00h | |
| | Location of Primary spare area | | 80 to 87 | 8 | b63-b56 | 00h |
| | | | | | b55-b32 | 031000h |
| | | | | | b31-b24 | 00h |
| | | | | | b23-b0 | 0341FFh |
| | Location of LSN0 | | 88 to 91 | 4 | b31-b24 | 00h |
| | | | | | b23-b0 | - |
| | reserved | | 92 to 255 | 164 | All 00h | |
| | Start LSN for each zone | Zone1 | 256 to 259 | 140 | b31-b24 | 00h |
| | | Zone2 | 260 to 263 | | b23-b0 | - |
| | | | | | b31-b24 | 00h |
| | | ... | ... | | b23-b0 | - |
| | | | | | ... | ... |
| | | Zone34 | 392 to 395 | | b31-b24 | 00h |
| | | | | | b23-b0 | - |
| | reserved | | 396 to 2047 | 1652 | All 00h | |

FIG. 3

| Class | Items | | Byte Position | of bytes | Expected value | |
|---|---|---|---|---|---|---|
| PDL | PDL Identifier | | 0 to 1 | 2 | 0001h | |
| | Number of entries in PDL | | 2 to 3 | 2 | E_PDL | |
| | Integrity of PDL entries | First PDL entry | 4 to 7 | 4 | b31-b30 | |
| | | | | | b23-b0 | |
| | | Second PDL entry | 8 to 11 | 4 | b31-b30 | |
| | | | | | b23-b0 | |
| | | ... | ... | ... | ... | ... |
| | | Last PDL entry | n to n+3 | 4 | b31-b30 | |
| | | | | | b23-b0 | |
| | Size of PDL | | | | 4×E_PDL+4 | |
| | Un-used area | | n+4 to 30719 | | FFh | |

FIG. 4

| Class | Items | Byte Position | of bytes | Expected value | |
|---|---|---|---|---|---|
| SDL | SDL identifier | 0 to 1 | 2 | 0002h | |
| | reserved | 2 to 3 | 2 | 00h | |
| | SDL Update counter | 4 to 7 | 4 | N+k | |
| | Start sector number of SSA | 8 to 11 | 4 | b31-b24 | 00h |
| | | | | b23-b0 | - |
| | Total number of logical sectors | 12 to 15 | 4 | | |
| | DDS/PDL Update counter | 16 to 19 | 4 | M+k | |
| | Spare area full flag | 20 | 1 | b7-b2 | All 0b |
| | | | | b1 | - |
| | | | | b0 | - |
| | reserved | 21 | 1 | 00h | |
| | Number of entries in SDL | 22 to 23 | 2 | $E_{SDL}$ | |
| | Integrity of SDL entries — First SDL entry | 24 to 31 | 8 | b63-b56 | 00h |
| | | | | b55-b32 | |
| | | | | b23-b0 | |
| | Second SDL entry | 32 to 39 | 8 | b62 | |
| | | | | b55-b32 | |
| | | | | b23-b0 | |
| | ... | ... | ... | ... | ... |
| | Last SDL entry | m to m+7 | 8 | b62 | |
| | | | | b55-b32 | |
| | | | | b23-b0 | |
| | Size of PDL | | | $8 \times E_{SDL} + 24$ | |
| | Un-used SDL area | m+8 to 32767 | | FFh | |

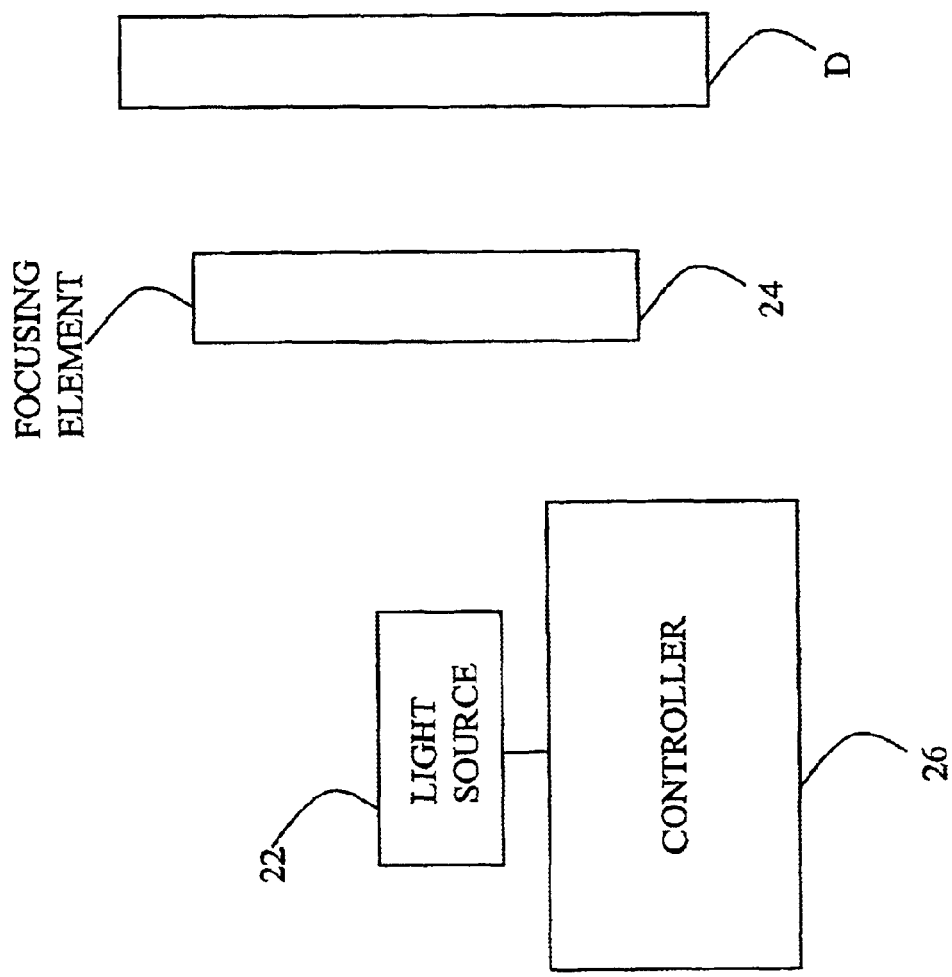

METHOD OF VERIFYING DEFECT MANAGEMENT AREA INFORMATION OF OPTICAL DISC

CROSS-REFERENCE TO RELATED APPLICATIONS

This application claims the benefit of Korean Application No. 00-18508, filed Apr. 8, 2000, in the Korean Patent Office and U.S. Provisional Application No. 60/195,467, filed Apr. 10, 2000, in the U.S. Patent & Trademark Office, the disclosures of which are incorporated herein by reference.

BACKGROUND OF THE INVENTION

1. Field of the Invention

The present invention relates to optical disc recording and reproducing technology, and more particularly, to a method of verifying the defect management area information of a recordable and reproducible optical disc.

2. Description of the Related Art

Digital versatile disc-random access memory (DVD-RAM) discs have a defect management function of replacing defective areas with normal recordable areas, and storing information necessary for management of the defective areas in a portion referred to as a defect management area (DMA) thereon. The DMA is repeatedly recorded in four portions on a disc: two portions in a lead-in area and two portions in a lead-out area. DMA information includes a disc definition structure (DDS), a primary defect list (PDL) and a secondary defect list (SDL).

The DMA information includes information on a spare area and important information on the start logical sector number of each zone, in addition to information on defects, which are detected during certification performed while a disc is being initialized or during use of the disc.

Some information included in the DMA can be immediately read and used. On the other hand, the DMA includes information which varies with the positions and the number of defects on a disc. That is, some information, for example, the position information of the start logical sector number of each zone or the position information of a first logical sector number, can be obtained only by performing complex computation according to a given algorithm based on defect information registered in the DMA.

Since such DMA information is closely related to a physical data recording position, a recording medium such as an optical disc, which can be used in a given recording and reproducing apparatus even if the DMA information on the disc has been generated or updated in another recording and reproducing apparatus, may not be compatible with both recording and reproducing apparatuses when the DMA information is wrong. To overcome this problem, a means or method of verifying that a recording and reproducing apparatus correctly reads DMA information from a disc and correctly records DMA information on the disc is desired.

SUMMARY OF THE INVENTION

To solve the above problem, a first object of the present invention is to provide a method of verifying that defect management area (DMA) information on a disc is correctly recorded and updated in an optical disc recording and reproducing apparatus which detects defects on the disc and records information on the defects in a DMA.

A second object of the present invention is to provide a method of verifying that defect management area (DMA) information on a disc is correctly recorded and updated in a recording and reproducing apparatus for repeatedly recordable and reproducible DVD-RAM discs, which detects defects on the disc and records information on the defects in the DMA.

A third object of the present invention is to provide a method of verifying that an optical recording and reproducing apparatus always reads and processes defect information properly, under the same conditions without being influenced by an actual state of a disc having defect information, using a test disc containing predetermined defect information which does not have any relation with actual defects.

Additional objects and advantages of the invention will be set forth in part in the description which follows and, in part, will be obvious from the description, or may be learned by practice of the invention.

To achieve the above and other objects of the invention, there is provided a method of verifying that DMA information is properly generated or updated after a recording and reproducing apparatus, which records or reproduces information to or from an optical disc with DMA information, performs a process in a test mode for testing the generation or update of DMA information. The method includes reading the generated or updated DMA information, verifying the generated or updated DMA information using reference DMA information which is predetermined for the test mode, and providing the verified result.

BRIEF DESCRIPTION OF THE DRAWINGS

The above objects and advantages of the present invention will become more apparent by describing in detail an embodiment thereof with reference to the attached drawings in which:

FIG. 1 is a table showing check items arranged for verifying a defect management area (DMA) structure;

FIG. 2 is a table showing check items arranged for verifying a disc definition structure (DDS);

FIG. 3 is a table showing check items arranged for verifying a primary defect list (PDL) structure;

FIG. 4 is a table showing check items arranged for verifying a secondary defect list (SDL) structure;

FIG. 6 shows an apparatus transferring data with respect to a recording medium according to an embodiment of the present invention.

DETAILED DESCRIPTION OF THE INVENTION

Figure 5A:
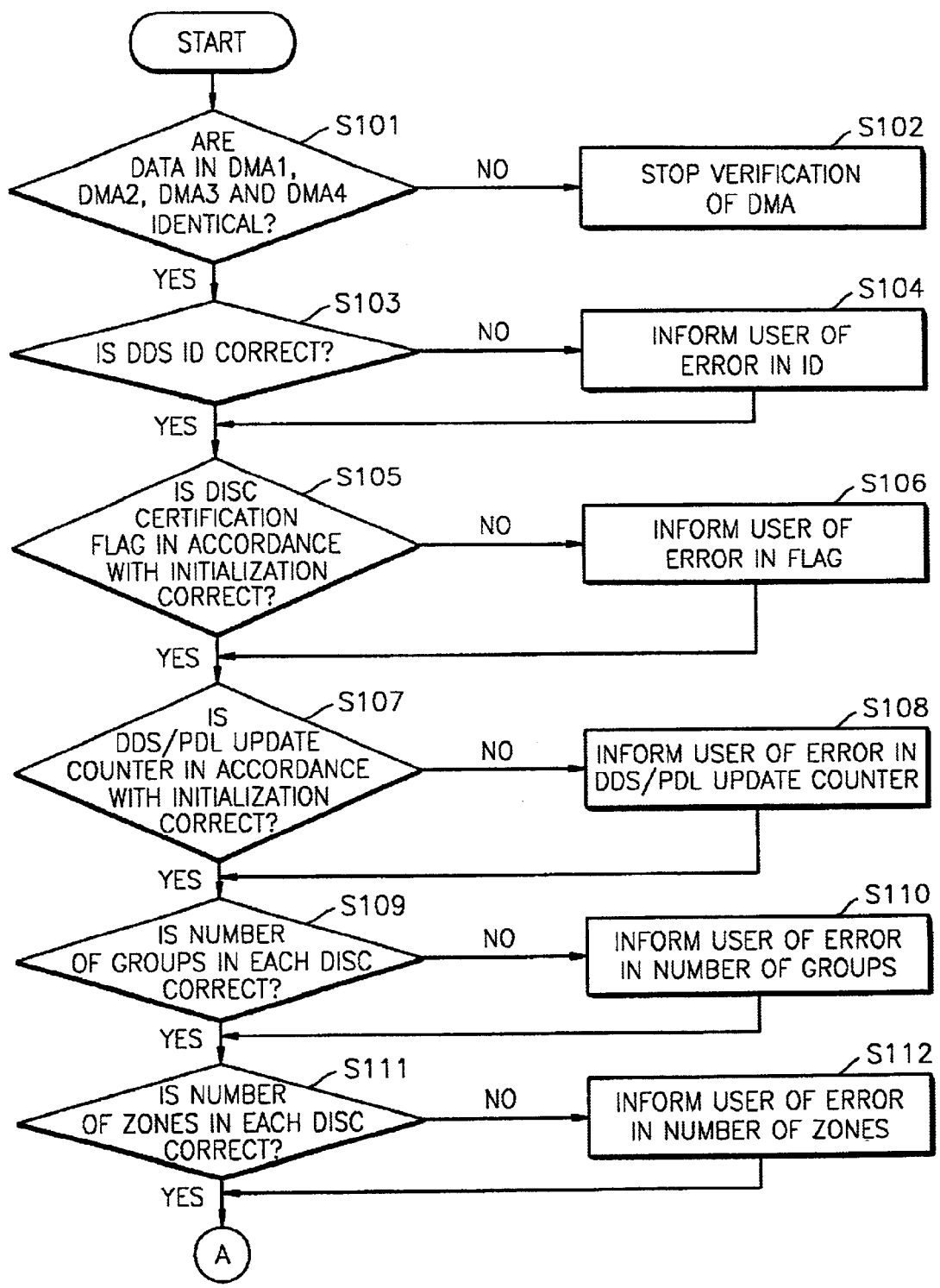
FIGS. 5A through 5D are flowcharts of a method of verifying DMA information according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

An optical disc used in the present invention is a phase change recording DVD-RAM disc having a capacity of 4.7 gigabytes (GB). DVD-RAM discs are defined in the "DVD Specification for Rewritable Discs Version 2.0."

In the case of a DVD-RAM disc, every defect management process is supposed to be performed by a drive so that the file system or the host interface can record or reproduce a file without information related to physical defect management. Accordingly, most of the drives cannot record or reproduce information in or from defect management area (DMA), and moreover, are not provided with a standard command for recording or reproducing information in or from the DMA. However, an environment must be prepared in a way such that data can be read by a computer, which can analyze DMA information, to determine whether the DMA information is properly formed, and it must be possible to record accurate information in a corresponding DMA to make a standard test disc.

Here, the recording and reproducing architecture of the DVD-RAM recording and reproducing apparatus is divided into a file system layer, a host interface layer for interfacing a host computer with the recording and reproducing apparatus, a physical drive layer for recording and reproducing physical signals and a recording medium layer. Physical sector numbers of a disc are assigned by a recording medium and a physical drive, and logical sector numbers of a disc are assigned by a host interface and a file system. Accordingly, writing and reading of DMA information is performed in the physical drive layer and the layers therebelow.

However, when user data is actually recorded by the file system, the user data is transmitted to a recording and reproducing apparatus using only the logical sector number, and the recording and reproducing apparatus converts the logical sector number into the physical sector number, which indicates a position at which the data is actually recorded, using defect management information. Accordingly, when defect management information contained in a disc has erroneously been read and written in a given recording and reproducing apparatus, data cannot be exactly read from or written to the disc in another recording and reproducing apparatus.

A first test disc, which is obtained by making known physical defects on a blank disc having no information, is used in initialization without certification and initialization with certification. A second disc, which is obtained by recording DMA with the predetermined contents and a first mirror file, which satisfies a state in which a supplementary spare area is not full, on the first test disc, is used in reinitialization with certification, in reinitialization with secondary defect list (SDL) conversion, and in reinitialization with the clearing of a G2-list and an SDL. A third test disc, which is obtained by recording DMA with predetermined contents and a second mirror file, which satisfies a state having sufficient SDL defects to fulfill the supplementary spare area, on the first test disc, is used in a mode of verifying the extension of a supplementary spare area. A fourth test disc, which is obtained by recording a third mirror file satisfying a state, in which, among predetermined DMA contents, the start logical sector number of each zone is intentionally recorded wrongly, on the first test disc, is used in a mode of verifying whether recording is performed according to wrong DMA information. Therefore, it is verified whether the DMA information is correctly generated or updated upon each of the modes described above. Reinitialization with SDL conversion and reinitialization with clearing the G2-list and the SDL may be referred to as reinitialization without certification. In initialization without certification, a first test disc, i.e., a blank disc on which no data is recorded, may be used. As long as no "information" is recorded and only "known physical defects" are present on the first test disc, the first test disc may be regarded as being blank.

In each of the verification modes described above, the generated or updated DMA information covers a DMA structure, a disc definition structure (DDS), a primary defect list (PDL) structure and an SDL structure.

As shown in FIG. 1, the check items for verifying the DMA structure include an error condition of DMA1 through DMA4, DDS/PDL update counters in DDS1 through DDS4 and in SDL1 through SDL4, SDL update counters in SDL1 through SDL4, and contents of DMA1 through DMA4.

The error condition of a DMA item is for checking whether errors exist in DMAs, two of which are located in a lead-in area and two of which are located in a lead-out area. Uncorrectable errors must not exist in any of the four DMAs, DMA1, DMA2, DMA3 and DMA4. If any uncorrectable error is detected in any one of the DMAs, the pertinent verification is determined to be a failure, and a test needs to be retried using a new test disc.

To verify the DDS/PDL and SDL update counter item upon initialization without certification, it is checked whether the values "M+k," which indicate the values of DDS/PDL update counters in four DDSs, i.e., DDS1, DDS2, DDS3 and DDS4, and in four SDLs, i.e., SDL1, SDL2, SDL3 and SDL4, and values k, which indicate increments of the DDS/PDL update counters representing a difference in the DDS/PDL update counter "M" before and after a test, are all "0." It is also checked whether the values of the eight DDS/PDL update counters are the same. Here, the value of each DDS/PDL update counter indicates the total number of update and rewrite operations, which are performed on a DDS/PDL block. The value of each DDS/PDL update counter must be set to "0" at the beginning of the initialization, and increased by one when a DDS/PDL block is updated or rewritten. When initialization is completed, the DDS/PDL and SDL blocks must have the same update counter values. Similarly, it is checked whether the values N, which indicate the values of SDL update counters in four SDLs, i.e., SDL1, SDL2, SDL3 and SDL4, and values k, which indicate the increments of the counters, are all "0." It is also checked whether the values of the four SDL update counters are the same.

However, since DMA information is generated only one time in a mode of initialization without certification, updating is not performed. Accordingly, the DDS/PDL update counter value must to be set to the value "0" that is set when DMA information is first written.

In a mode of initialization with certification, it is checked whether the values M, which indicate the values of the DDS/PDL update counters in the four DDSs, i.e., DDS1, DDS2, DDS3 and DDS4, and in the four SDLs, i.e., SDL1, SDL2, SDL3 and SDL4, are "0," and whether the values k, which indicate the increments of the DDS/PDL update counters, are "1." It is also checked whether the values "N+k," which indicate the values of the SDL update counters in four the SDLs, i.e., SDL1, SDL2, SDL3 and SDL4, are "0," and whether the values k, which indicate increments of the SDL update counters representing a difference in the SDL update counters "N" before and after a test are "1." It is checked whether the values of the four SDL update counters are the same.

The basic structure of the DMA before certification for detecting defects on a disc begins, is recorded. Under the state in which the value of a bit indicating "in-progress" in a disc certification flag within the DDS of the DMA is set to "1b," the certification begins when the value of each update counter is set to "0" which is an initial value when the certification begins. The value of the update counter is increased by one when the DMA is updated by recording information on defects in the DMA after completion of the certification.

In a mode of reinitialization without certification, it is checked whether the values M, which indicate the values of the DDS/PDL update counters in the four DDSs, i.e., DDS1, DDS2, DDS3 and DDS4, and in the four SDLs, i.e., SDL1, SDL2, SDL3 and SDL4, are "previous values," and whether the values k, which indicate the increments of the DDS/PDL update counters, are "1." The "previous value" means the value of "M" before a test. It is also checked whether the values of the eight DDS/PDL update counters are the same. In addition, it is checked whether the values N, which indicate the values of the SDL update counters in the four SDLs, i.e., SDL1, SDL2, SDL3 and SDL4, are "previous values," and whether the values k, which indicate the increment of the SDL update counters, are "1." The "previous value" means the value of "N" before and after a test. It is checked whether the values of the four SDL update counters are the same.

In a mode of reinitialization with certification, it is checked whether the values M, which indicate the values of the DDS/PDL update counters in the four DDSs, i.e., DDS1, DDS2, DDS3 and DDS4, and in the four SDLs, i.e., SDL1, SDL2, SDL3 and SDL4, are "previous values," and whether the values k, which indicate the increments of the counters, are "2." It is also checked whether the values of the eight DDS/PDL update counters are the same. In addition, it is checked whether the values N, which indicate the values of the SDL update counters in the four SDLs, i.e., SDL1, SDL2, SDL3 and SDL4, are "previous values," and whether the values k, which indicate the increments of the counters, are "2." It is checked whether the values of the four SDL update counters are the same.

To verify the contents of the DMA, it is checked whether the contents of the four DMAs, i.e., DMA1, DMA2, DMA3 and DMA4, are the same.

As shown in FIG. 2, check items for verifying the DDS in the DMA include a DDS identifier, a disc certification flag, a DDS/PDL update counter, a number of groups, a number of zones, a location of a primary spare area, a location of a first logical sector number (LSN0), a start LSN for each zone, etc.

It is verified that the DDS identifier is "0A0Ah." It is checked whether the value of the bit position b7, which indicates in-progress/not in-progress, in the one byte of the disc certification flag, is "0b." If the value of the bit position b7 is "0b," this indicates that formatting is completed. If the value of the bit position b7 is "1b," this indicates that formatting is in progress. Accordingly, when the value of the bit position b7 is "1b," this indicates that formatting is a failure.

In addition, it is checked whether reserved bit positions b6 through b2 in the disc certification flag are all "0b." It is checked whether the value of a bit position b1 indicating a user certification flag in the disc certification flag is "0b" in the mode of initialization without certification and "1b" in the modes of initialization with certification, reinitialization without certification and reinitialization with certification. It is also checked whether the value of a bit position b0 indicating a disc manufacturer certification flag in the disc certification flag is "0b" in the modes of initialization without certification and initialization with certification, and "1b" in the modes of reinitialization without certification and reinitialization with certification.

To verify the corresponding DDS/PDL update counter, it is checked whether a value M indicating the DDS/PDL update counter value and a value k indicating the increment of the counter are both "0" in the mode of initialization without certification. In the mode of initialization with certification, it is checked whether the value M indicating the DDS/PDL update counter value is "0," and it is checked whether the value k indicating the increment of the DDS/PDL update counter is "1." In the mode of reinitialization without certification, it is checked whether the value M indicating the DDS/PDL update counter value is a "previous value," and it is checked whether the value k indicating the increment of the DDS/PDL update counter is "1." In the mode of reinitialization with certification, it is checked whether the value M indicating the DDS/PDL update counter value is a "previous value," and it is checked whether the value k indicating the increment of the counter is "2."

It is also checked whether the value of the number of groups is "0001h" indicating that the number of groups is 1, and whether the value of the number of zones is "0023h" indicating that the number of zones is 35. For the verification of the location of a primary spare area, it is checked whether the first sector number of a primary spare area is "031000h," and whether the last sector number of the primary spare area is "0341FFh."

It is checked whether the location of LSN0 is a predetermined logical sector number, which indicates that there is no defect, in the mode of initialization without certification, and is determined based on the number of defects registered in the PDL in the modes of initialization with certification, reinitialization without certification and reinitialization with certification.

It is checked whether the start LSN of each zone, that is, each of the start LSNs of the second zone, Zone1, through the 35th zone, Zone34, is a predetermined logical sector number, which indicates that there is no defect, in the mode of initialization without certification, and is determined based on the number of defects registered in the PDL in the modes of initialization with certification, reinitialization without certification and reinitialization with certification. Here, information on all the known defective sectors on the first test disc should be registered in the PDL to verify whether the PDL structure is correct and whether a drive to be tested normally detects defects.

In the mode of verifying whether recording is performed according to wrong DMA information, the start LSN of each zone is intentionally recorded wrongly.

It is checked whether the remaining reserved areas (byte positions 396 to 2047) in the DDS structure are all "00h."

As shown in FIG. 3, check items for verifying the PDL structure in the DMA include a PDL identifier, a number of entries in the PDL, an integrity of PDL entries, etc.

It is checked whether the PDL identifier is "0001h." In case of the mode of initialization without certification, it is checked whether the number of entries in PDL is "0." In the other modes, it is checked whether the number of entries in the PDL is the number of the known physical defects and defects which occur differently on a disc during manufacture.

According to the initialization without certification, no information is supposed to exist in areas for a PDL entry type and a PDL entry. Accordingly, it is checked whether the PDL entry type and the PDL entry are "FFh" indicating an un-used area.

In the mode of initialization with certification, it is checked whether the PDL entry type is "10b" indicating a G1-list of defective sectors detected during user certification. The defective sector numbers in PDL are written in ascending order. After PDL entries corresponding to the number of the known physical defects are all written, and all information on defective sectors occurring differently on a disc during manufacture is written, it is checked whether the remaining un-used area is "FFh."

A P-list includes defective sectors detected by a manufacturer. A G1-list includes defective sectors detected during user certification. In the case of reinitialization, an old SDL before the reinitialization is converted into a G2-list. The P-list, G1-list and G2-list are included in the PDL.

In the mode of reinitialization with certification, it is checked whether the PDL entry type is "00b" indicating the known P-list or "10b" indicating the G1-list of defective sectors which occur during user certification. The defective sector numbers in the PDL are written in ascending order.

In the mode of reinitialization with SDL conversion, the PDL entry type may indicate one among all the three types described above. In other words, the PDL entry type may be "00b" indicating the P-list, "10b" indicating the G1-list of defective sectors which occur during user certification, or "11b" indicating the G2-list obtained after SDL conversion. The defective sector numbers in the PDL are written in ascending order.

In the mode of reinitialization with SDL conversion, the SDL entries, which are processed according to a linear replacement algorithm, are erased and replaced with PDL entries (i.e., the G2-list) which are obtained by processing 16 reassigned sectors, which are included in a defective block, among the SDL entries according to a slipping replacement algorithm. The P-list and the old G1-list are maintained, and the entries of the old G2-list and the entries of the old SDL are registered in the new G2-list. The new SDL is in a null state. However, the remaining SDL entries occurring when the number of the SDL entries exceeds the number of maximum entries registrable in the PDL, that is, when the old SDL overflows the new G2-list, may be registered in the new SDL.

In the mode of reinitialization with clearing G2-list and SDL, it is checked whether the PDL entry type is "00b" indicating the known P-list or "10b" indicating the G1-list of defective sectors which occur during user certification. The defective sector numbers in the PDL are written in ascending order.

Reinitialization with clearing the G2-list and the SDL is to initialize a disc only using the P-list while using the disc, or to return to the latest certified state by removing the sectors which are reassigned for linear replacement. In this reinitialization, the SDL and the G2-list in the PDL are disposed of, and the updated PDL includes the P-list and the G1-list. These three modes of reinitialization are defined in the "DVD Specification for Rewritable Discs Version 2.0."

As shown in FIG. 4, check items for verifying the SDL structure in the DMA include an SDL identifier, an SDL update counter, a start sector number of a secondary spare area (SSA), a total number of logical sectors, a DDS/PDL update counter, a spare area full flag, a number of entries in the SDL, an integrity of SDL entries, an un-used area, reserved areas, etc.

It is checked whether the SDL identifier is "0002h." To verify the corresponding SDL update counter, it is checked whether a value N indicating the SDL update counter value and a value k indicating the increment of the SDL update counter are both "0" in the mode of initialization without certification. In the mode of initialization with certification, it is checked whether the value N indicating the SDL update counter value is "0," and it is checked whether the value k indicating the increment of the SDL update counter is "1."

In the mode of reinitialization without certification, it is checked whether the value N indicating the SDL update counter value is a "previous value," and it is checked whether the value k indicating the increment of the SDL update counter is "1." In the mode of reinitialization with certification, it is checked whether the value N indicating the SDL update counter value is a "previous value," and it is checked whether the value k indicating the increment of the SDL update counter is "2."

To verify the corresponding DDS/PDL update counter, it is checked whether a value M indicating the DDS/PDL update counter value and a value k indicating the increment of the DDS/PDL update counter are both "0" in the mode of initialization without certification. In the mode of initialization with certification, it is checked whether the value M indicating the DDS/PDL update counter value is "0," and it is checked whether the value k indicating the increment of the DDS/PDL update counter is "1." In the mode of reinitialization without certification, it is checked whether the value M indicating the DDS/PDL update counter value is a "previous value," and it is checked whether the value k indicating the increment of the counter is "1." In the mode of reinitialization with certification, it is checked whether the value M indicating the DDS/PDL update counter value is a "previous value," and it is checked whether the value k indicating the increment of the DDS/PDL update counter is "2."

In the mode of initialization without certification, it is supposed that the start sector number of a secondary spare area has the start sector number corresponding to the size of the secondary spare area, which is designated by the user during the initialization, and that the total number of logical sectors is the total number of logical sectors which are set to correspond to the size. It is also supposed that information on the SDL entries does not exist in byte positions which indicate the spare area full flag, the number of entries in SDL, the integrity of SDL entries and the spare area integrity. Accordingly, the spare area full flag must indicate that the spare area is not full. The value of the number of entries in the SDL must to be "0." Usually, no information is supposed to exist in areas indicating the integrity of SDL entries and the spare area integrity. Accordingly, it is checked whether an area in which SDL entries are to be recorded is set to "FFh" indicating an unused area. However, when the state of a C-1 disc used for the test is very poor, an SDL entry may occur. Accordingly, it is preferable to use a C-1 disc whose state is substantially good.

In the modes of initialization with certification and reinitialization with certification, it is checked whether the start sector number of the SSA and the total number of logical sectors have proper values depending on the size of the SSA, which is designated by the user during the initialization. It is also supposed that the spare area full flag indicates a state in which the SSA is not full, and that the value of the number of entries in SDL is set to "0" generally indicating that nothing exists. Because the total used area of the SDL is known, if the number of entries in the SDL is checked, the size of the un-used area of the SDL can be determined. Accordingly, it is checked whether the size of the un-used area of the test disc DMA mirror file is equal to the size of the un-used area of the SDL, which is known based on the number of entries in the SDL, and also it is checked whether the un-used area is set to "FFh." Also, it is checked whether the expected values of all reserved areas area "00h."

In the reinitialization with SDL conversion, it is checked whether the start sector number of SSA and the total number of logical sectors have proper values depending on the size of the SSA, which is designated by the user during the initialization. It is also supposed that the spare area full flag indicates a state in which the SSA is not full. The number of entries in SDL may be set to the number of entries, which are not converted into the G2-list but remain in the SDL. The integrity of the SDL entries may include the SDL entries which are not converted into the entries of the G2-list. Since no information is supposed to exist in byte positions indicating the integrity of the remaining SDL entries and the spare area integrity, it is checked whether the byte positions are set to "FFh" indicating an un-used area.

In the mode of reinitialization with clearing the G2-list and the SDL, it is checked whether the start sector number of the SSA and the total number of logical sectors have proper values depending on the size of the SSA, which is designated by the user during the initialization. It is also supposed that the spare area full flag indicates a state in which the SSA is not full, and that the value of the number of entries in the SDL is set to "0" indicating that nothing exists. Since no information is supposed to exist in byte positions indicating the integrity of the SDL entries and the spare area integrity, it is checked whether the byte positions are set to "FFh" indicating an un-used area.

In the mode of verifying the extension of a supplementary spare area, it is checked whether a byte position, "b1," indicating a supplementary spare area full flag in the spare area full flag is "1b" indicating a full state. It is also checked whether the start sector number of the SSA is assigned a multiple of 32 and is a sector number corresponding to the first sector of an error correction code (ECC) block.

In the modes of initialization with certification, reinitialization without certification and reinitialization with certification, a bit position, "b0," indicating a primary spare area full flag in the one-byte spare area fall flag is set to "1b" when the primary spare area is full and is set to "0b" when the primary spare area is not full.

Figure 5B:
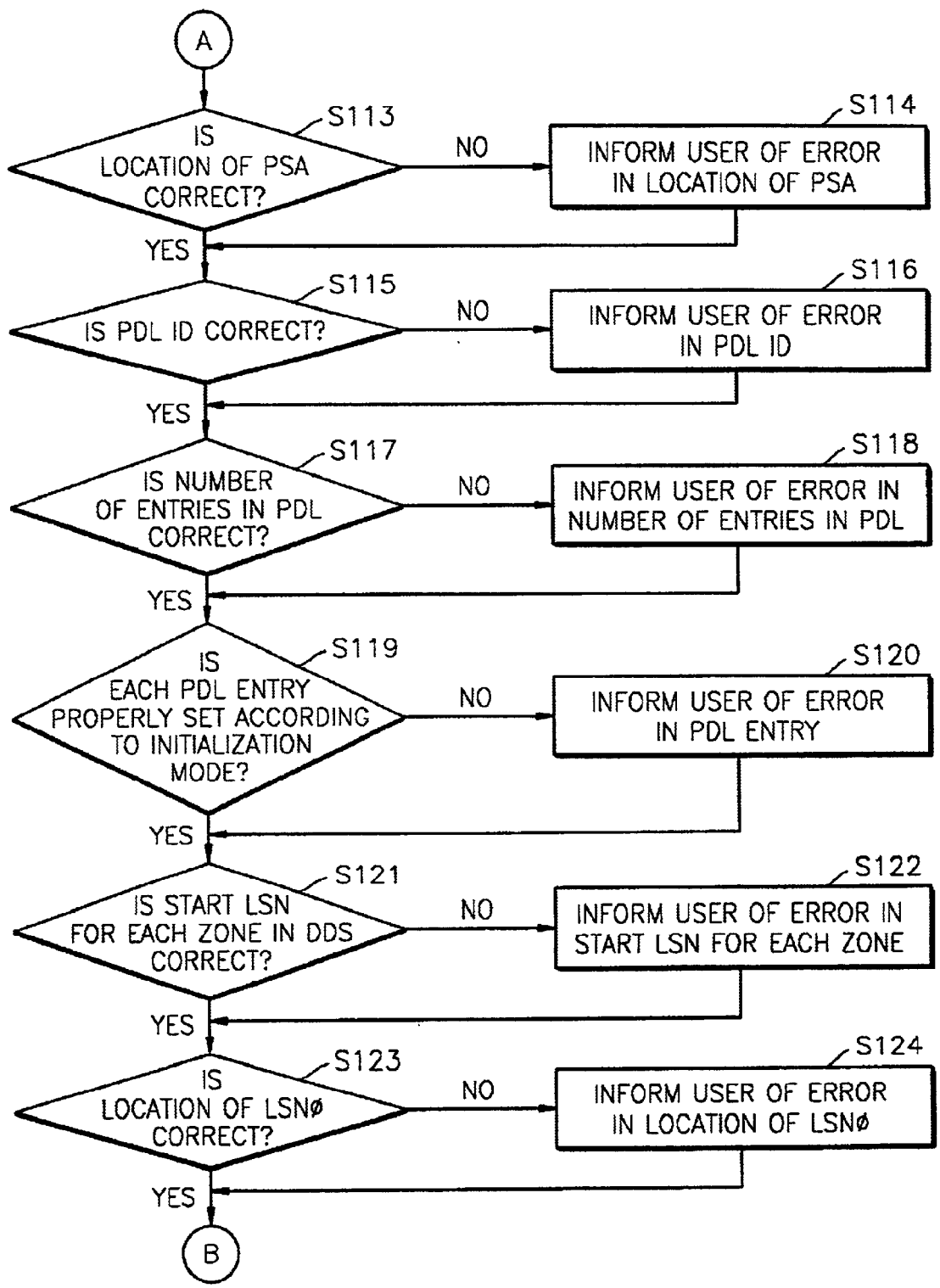
Figure 5C:
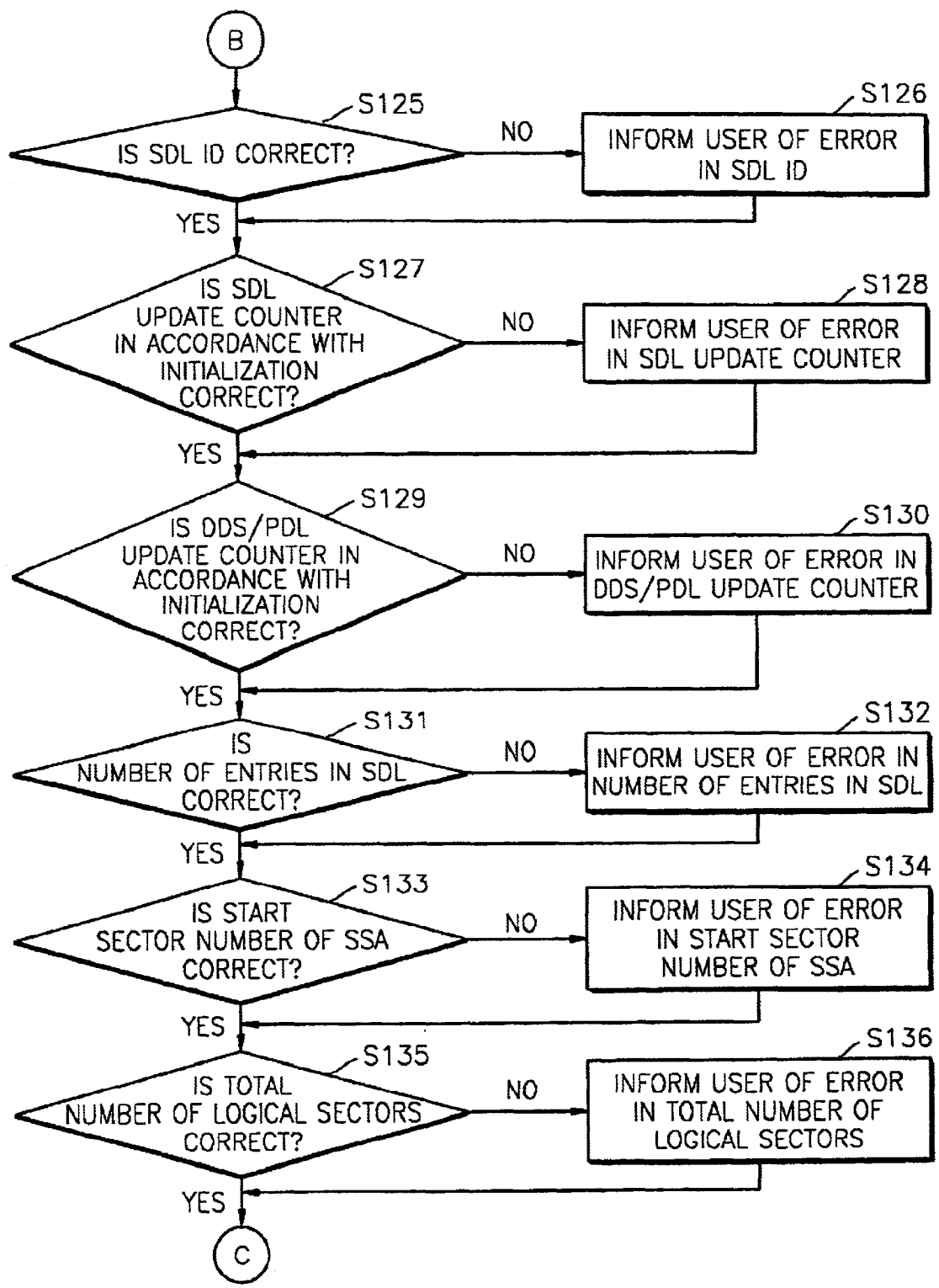
Figure 5D:
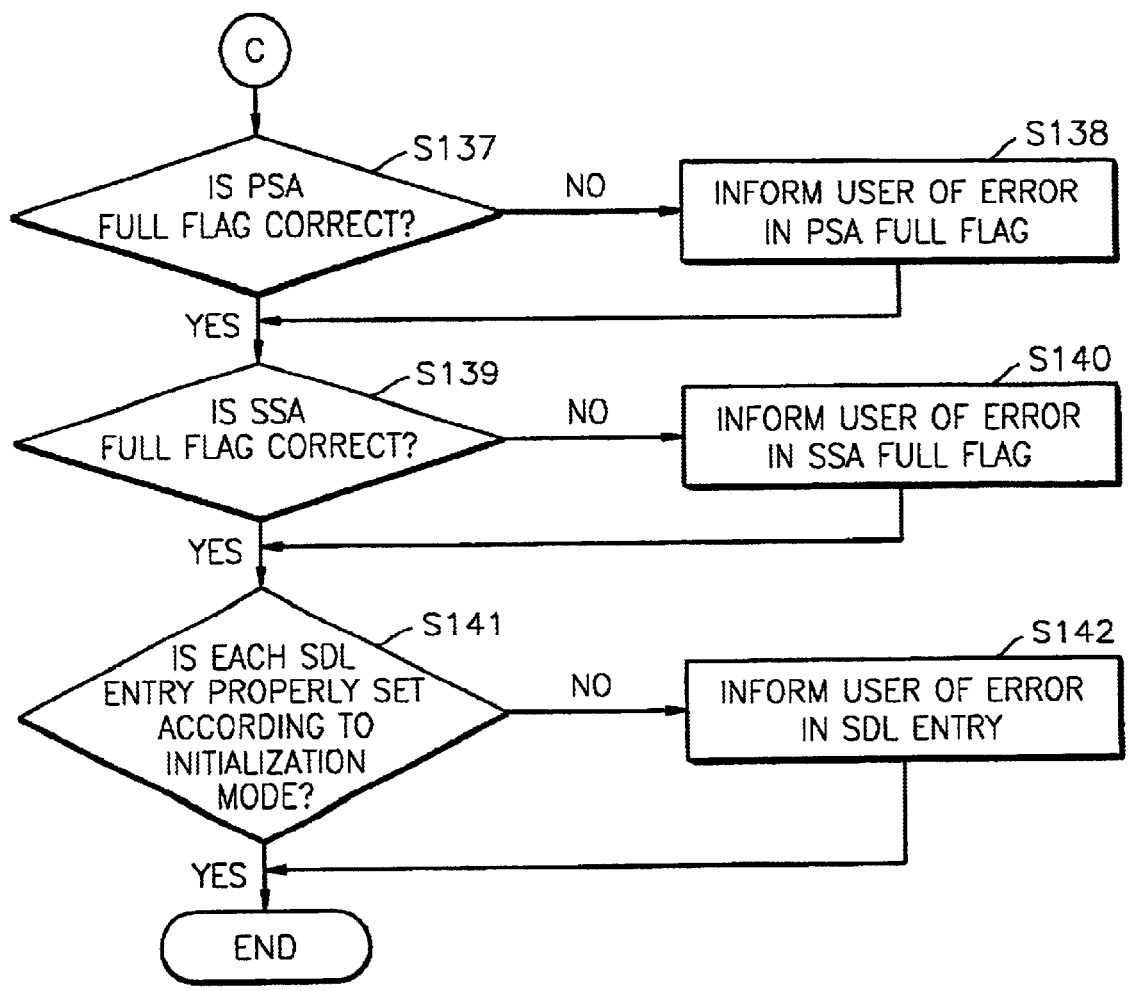

FIGS. 5A through 5D are flowcharts of a method of verifying DMA information of an optical disc according to an embodiment of the present invention. A method of verifying that DMA information is correctly generated or updated after processes of generating or updating DMA information are performed in various test modes is disclosed.

Referring to FIGS. 5A through 5D, in operation S101, it is checked whether data in DMA1, DMA2, DMA3 and DMA4, two of which are located in a lead-in area and two of which are located in a lead-out area, are identical. If any one of the data in the four DMAs is different, the verification of DMA stops in operation S102. In operation S101, all the contents of DMA shown in FIG. 1 are checked.

If the data in the four DMAs are identical in operation S101, the identifier (ID) of the DDS is checked in operation S103. If the DDS ID is not identical to a predetermined DDS ID, the user is informed of an error in ID in operation S104, and the process goes to operation S105.

If the ID is identical to the predetermined DDS ID in operation S103, a disc certification flag in accordance with an initialization mode is checked in operation S105. If the disc certification flag in accordance with an initialization mode is not properly set, the user is informed of an error in the disc certification flag in operation S106, and the process goes to operation S107.

If the disc certification flag is properly set according to the initialization mode in operation S105, a DDS/PDL update counter in accordance with the initialization mode is checked in operation S107. If the DDS/PDL update counter is not properly set, the user is informed of an error in the DDS/PDL update counter in operation S108, and the process goes to operation S109.

If the DDS/PDL update counter in accordance with the initialization mode is properly set in operation S107, the number of groups in a disc is checked in operation S109. If the number of groups is not properly set, the user is informed of an error in the number of groups in operation S110, and the process goes to operation S111.

If the number of groups in a type of disc is properly set in operation S109, the number of zones in a disc is checked in operation S111. If the number of zones is not properly set, the user is informed of an error in the number of zones in operation S112, and the process goes to operation S113. In the embodiment of the present invention, the type of disc is a DVD-RAM, the number of groups is 1, and the number of zones is 35.

If the number of zones in a type of a disc is properly set in operation S111, the location of a primary spare area (PSA) in the disc is checked in operation S113. If the location of the PSA is not properly set, the user is informed of an error in the location of the PSA in operation S114, and the process goes to operation S115.

If the location of PSA according to the type of the disc is properly set in operation S113, PDL ID is checked in operation S115. If the PDL ID is not properly set, the user is informed of an error in the PDL ID in operation S116, and the process goes to operation S117.

If the PDL ID is properly set in operation S115, the number of entries in the PDL is checked in operation S117. If the number of entries in the PDL is not properly set, the user is informed of an error in the number of entries in the PDL in operation S118, and the process goes to operation S119.

If the number of entries in the PDL is properly set in operation S117, it is checked whether each PDL entry is properly set according to an initialization mode in operation S119. If each PDL entry is not properly set, the user is informed of an error in a PDL entry in operation S120, and the process goes to operation S121.

If each PDL entry is properly set according to an initialization mode in operation S119, the start LSN for each zone in the DDS is checked in operation S121. If the start LSN for each zone in DDS is not properly set, the user is informed of an error in the start LSN for each zone in operation 122, and the process goes to operation S123.

If the start LSN for each zone in the DDS is properly set, the location of a first logical sector number LSN0 is checked in operation S123. If LSN0 is not properly set, the user is informed of an error in the location of LSN in operation S124, and the process goes to operation S125.

Since the start LSN for each zone and the first LSN, LSN0, in the DDS are determined based on the number of defects which are registered in the PDL, operation S119 of checking the PDL entries is prior to steps of checking the start LSN for each zone and checking the location of LSN0.

If the location of LSN0 is properly set in operation S123, an SDL ID is checked in operation S125. If the SDL ID is not properly set, the user is informed of an error in the SDL ID in operation S126, and the process goes to operation S127.

If the SDL ID is properly set in operation S125, an SDL update counter in accordance with an initialization mode is checked in operation S127. If the SDL update counter is not properly set, the user is informed of an error in the SDL update counter in operation S128, and the process goes to operation S129.

If the SDL update counter is properly set according to the initialization mode in operation S127, a DDS/PDL update counter in accordance with the initialization mode is checked in operation S129. If the DDS/PDL update counter is not properly set, the user is informed of an error in the DDS/PDL update counter in operation S130, and the process goes to operation S131.

If the DDS/PDL update counter is properly set according to the initialization mode in operation S129, the number of entries in the SDL is checked in operation S131. If the number of entries in SDL is not properly set, the user is informed of an error in the number of entries in the SDL in operation S132, and the process goes to operation S133.

If the number of entries in SDL is properly set in operation S131, the start sector number of the SSA is checked in operation S133. If the start sector number of the SSA is not properly set, the user is informed of an error in the start sector number of the SSA in operation S134, and the process goes to operation S135.

If the start sector number of SSA is properly set in operation S133, the total number of logical sectors is checked in operation S135. If the total number of logical sectors is not properly set, the user is informed of an error in the total number of logical sectors in operation S136, and the process goes to operation S137.

If the total number of logical sectors is properly set in operation S135, a PSA full flag is checked in operation S137. If the PSA full flag is not properly set, the user is informed of an error in a spare area full flag in operation S138, and the process goes to operation S139.

In operation S137, it is checked whether the PSA full flag is set to "1b" when the number of entries in the PDL checked in operation S117 corresponds to a PSA full state, and it is checked whether the PSA full flag is set to "0b" when the number of entries in PDL does not correspond to a PSA full state.

If the PSA full flag is properly set in operation 137, an SSA full flag is checked in operation S139. If the SSA full flag is not properly set, the user is informed of an error in the spare area full flag in operation S140, and the process goes to operation S141.

In operation S139, it is checked whether the SSA full flag is set to "1b" when the number of entries in the SDL checked in operation S131 corresponds to an SSA full state, and it is checked whether the SSA full flag is set to "0b" when the number of entries in the SDL does not correspond to an SSA full state.

If the SSA full flag is properly set in operation 139, it is checked whether each SDL entry is properly set according to the initialization mode in operation S141. If each SDL entry is not properly set, the user is informed of an error in the SDL entry in operation S142. If each SDL entry is properly set, the verification method of the present invention ends.

As described above, the present invention easily verifies that a recording and reproducing apparatus properly generates or updates defect information, using a different test disc having predetermined defect information, which has no relation with actual defects, in each test type, instead of using a disc having the actual defects.

In addition, the present invention easily verifies that a recording and reproducing apparatus exactly reads and processes defect information, using a different test disc which generates a mirror file from predetermined defect information, which has no relation with actual defects in each test mode, instead of using a disc having the actual defects. FIG. 6 shows the recording and reproducing apparatus to be tested having a light source 22 to emit light, a focusing element 24 to focus the light from the light source on a disc D, and a controller 26 which controls the light source 22. The verification process described above seeks to verify the proper operation of the controller 26.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of verifying that defect management area (DMA) information is properly generated or updated after a recording and/or reproducing apparatus, which records and/or reproduces information on and/or from an optical disc with DMA information, performs a process in a test mode for testing the generation or update of the DMA information, the method comprising:

reading the generated or updated DMA information; and verifying the read generated or updated DMA information using reference DMA information which is predetermined for the test mode to provide a verified result.

2. The method of claim 1, wherein the generated or updated DMA information is read in a form of a DMA mirror file.

3. The method of claim 1, wherein the generated or updated DMA information is directly read from a DMA area on a test disc.

4. The method of claim 1, wherein the test mode is one among a first test mode including initialization with certification and initialization without certification, a second test mode including reinitialization with certification, reinitialization with secondary defect list (SDL) conversion and reinitialization with clearing a G2-list and an SDL, a third test mode for verifying an expansion of a supplementary spare area, and a fourth test mode for verifying whether recording is performed based on wrong DMA information.

5. The method of claim 4, further comprising:

obtaining a first test disc by forming known physical defects on a blank disc have no information and using the first test disc in the first test mode;

obtaining a second test disc by recording pre-fixed contents of a DMA on the first test disc, and using a first mirror file in which the supplementary spare area is not full as the DMA information recorded on the first test disc, in the second test mode;

obtaining a third test disc by recording the pre-fixed contents of the DMA on the first test disc, and using a second mirror file having sufficient SDL defects to fill the supplementary spare area as the DMA recorded on the first test disc, in the third test mode; and obtaining a fourth test disc by recording a third mirror file, in which a start sector number of each zone among the pre-fixed contents of the DMA is written wrongly on purpose, on the first test disc, in the fourth test mode.

6. The method of claim 1, wherein the verifying comprises verifying that a plurality of DMAs, which is the DMA written in a plurality of positions on the optical discs, have the same data.

7. The method of claim 1, wherein the verifying comprises verifying a disc definition structure (DDS) in a DMA.

8. The method of claim 7, wherein the verifying of the DDS comprises checking a DDS identifier, a disc certification flag, DDS/primary defect list (PDL) update counters, a number of groups, a number of zones, a location of a primary spare area, a location of a first logical sector number and a start logical sector number for each zone.

9. The method of claim 8, wherein:
the checking the DDS identifier comprises checking whether the DDS identifier is a predetermined value;
the checking the disc certification flag comprises checking a value of a bit indicating in-progress in the disc certification flag, a value of a bit indicating user certification and a value of a bit indicating disc manufacturer certification in accordance with a predetermined test mode;
the checking the DDS/PDL update counters comprises checking the DDS/PDL update counter values and increments of the DDS/PDL update counters representing a difference in the DDS/PDL update counters before and after the predetermined test in accordance with the predetermined test mode;
the checking the number of groups comprises checking the number of groups in accordance with a disc type;
the checking the number of zones comprises checking the number of zones in accordance with the disc type; and
the checking the location of the primary spare area comprises checking the first and last sector numbers of the primary spare area.

10. The method of claim 9, wherein the checking the disc certification flag comprises:
checking whether a value of a bit position b7 indicating in-progress/not in-progress in the disc certification flag is "0b" and informing a user that formatting is a failure when the value of the bit position b7 is "1b" because the value of the bit position b7 being "0b" indicates that formatting is completed, and the value of the bit position b7 being "1b" indicates that formatting is in progress;
checking whether reserved bit positions b6 through b2 in the disc certification flag are all "0b";
checking whether a value of a bit position b1 indicating the user certification flag in the disc certification flag is "0b" in a mode of initialization without certification, and is "1b" in modes of initialization with certification, reinitialization without certification and reinitialization with certification; and
checking whether a value of a bit position b0 indicating the disc manufacturer certification flag in the disc certification flag is "0b" in the modes of initialization without certification and initialization with certification, and is "1b" in the mode of reinitialization without certification and reinitialization with certification.

11. The method of claim 9, wherein the checking the DDS/PDL update counters comprises:
checking whether the DDS/PDL update counter values and the increments of the DDS/PDL update counters are all "0" in a mode of initialization without certification,
checking whether the DDS/PDL update counter values are "0" and the increments of the DDS/PDL update counters representing a difference in the DDS/PDL update counters before and after the predetermined test are "1" in a mode of initialization with certification,
checking whether the DDS/PDL update counter values are a "previous value" and the increments of the DDS/PDL update counters are "1" in a mode of reinitialization without certification, and
checking whether the DDS/PDL update counter values are a "previous value" and the increments of the DDS/PDL update counters representing a difference in the DDS/PDL update counters before and after the predetermined test are "2" in a mode of reinitialization with certification.

12. The method of claim 1, wherein the verifying comprises verifying a primary defect list (PDL) structure in a DMA.

13. The method of claim 12, wherein the verifying of the PDL structure comprises checking a PDL identifier, a number of entries in the PDL and an integrity of the PDL entries.

14. The method of claim 13, wherein:
the checking the identifier comprises checking whether the PDL identifier is a predetermined value;
the checking the number of entries comprises checking whether the number of entries in the PDL is a predetermined number; and
the checking the integrity of the PDL entries comprises:
checking whether a location of a first logical sector number is property set based on a number of entries registered in the PDL, and
checking whether the start logical sector number for each zone is properly set based on the number of entries registered in the PDL.

15. The method of claim 14, wherein the checking the number of entries comprises:
checking whether the number of entries in the PDL is "0" in a mode of initialization without certification, and
checking whether the number of entries in the PDL is the number of the known physical defects and defects, which occur differently on a disc during manufacture, in modes of initialization with certification, reinitialization without certification and reinitialization with certification.

16. The method of claim 14, wherein the checking the integrity of the PDL entries comprises:
checking whether areas for a PDL entry type and a PDL entry have values indicating an un-used area in a mode of initialization without certification,
checking whether the PDL entry type is "10b" indicating a G1-list of defective sectors detected during user certification in a mode of initialization with certification,
checking whether the PDL entry type is "00b" indicating a known P-list or "10b" indicating the G1-list of defective sectors detected during user certification in a mode of reinitialization with certification and in a mode of reinitialization with clearing a G2-list and a secondary defect list (SDL),
checking whether the PDL entry type is "00b" indicating the P-list, "10b" indicating the G1-list of defective sectors detected during user certification, or "11b" indicating the G2-list obtained after SDL conversion in a mode of reinitialization with SDL conversion, and
checking whether a remaining un-used area is "FFh" after the PDL entries corresponding to the number of the known physical defects are all written, and all information on defective sectors occurring differently on a disc during manufacture is written, in the modes of initialization with certification, reinitialization with certification, reinitialization with SDL conversion and the reinitialization with clearing the G2-list and the SDL.

17. The method of claim 14, wherein the checking the locations of the first logical sector number and the start logical sector number comprises checking whether the location of the first logical sector number (LSN0) and the start logical sector number for each zone are predetermined logical sector number corresponding to a case in which no defects exist in a mode of initialization without certification.

18. The method of claim 1, wherein the verifying comprises verifying a secondary defect list (SDL) structure in a DMA.

19. The method of claim 18, wherein the verifying of the SDL structure comprises:

checking an SDL identifier;

checking SDL update counter values and increments of the SDL update counters representing a difference in the SDL update counters before and after the test;

checking disc definition structure (DDS)/primary defect list (PDL) update counter values and increments of the DDS/PDL update counters representing a difference in the DDS/PDL update counters before and after the test;

checking logical sector numbers in a secondary spare area (SSA) and a total number of logical sectors;

checking a spare area full flag;

checking a number of entries in the SDL; and checking an integrity of the SDL entries.

20. The method of claim 19, wherein the checking the SDL update counters and increments of the SDL update counters comprises:

checking whether the SDL update counter values in four SDLs and the increments of the SDL update counters are all "0" in a mode of initialization without certification, checking whether the SDL update counter values are "0" and the increments of the counters are "1" in a mode of initialization with certification.

checking whether the SDL update counter values are a "previous value" and the increments of the SDL update counters are "1" in a mode of reinitialization without certification, and checking whether the SDL update counter values are a "previous value" and the increments of the SDL update counters are "2" in a mode of reinitialization with certification.

21. The method of claim 19, wherein the checking the DDS/PDL update counter values and increments of the DDS/PDL update counters comprises:

checking whether the DDS/PDL update counter values and the increments of the DDS/PDL update counters are all "0" in a mode of initialization without certification, checking whether the DDS/PDL update counter values are "0" and the increments of the DDS/PDL update counters are "1" in a mode of initialization with certification.

checking whether the DDS/PDL update counter values are a "previous value" and the increments of the DDS/PDL update counters are "1" in a mode of reinitialization without certification, and checking whether the DDS/PDL update counter values are a "previous value" and the increments of the DDS/PDL update counters are "2" in a mode of reinitialization with certification.

22. The method of claim 19, wherein the checking the logical sector numbers in the SSA and the total number of logical sectors comprises:

checking whether a start sector number of the SSA is a start sector number corresponding to a size of the SSA which is designated by a user, and checking whether the total number of logical sectors is a total number of logical sectors properly set based upon the size of the SSA designated by the user, in an initialization mode or an reinitialization mode.

23. The method of claim 19, wherein the checking the spare area full flag comprises:

checking whether a primary spare area (PSA) full flag is set based on a number of entries in the PDL; and checking whether a SSA full flag is set based on the number of entries in the SDL.

24. The method of claim 23, wherein the checking the spare area full flag comprises:

checking whether the SSA spare area full flag is set to a state in which the SSA is not full in an initialization mode and in a reinitialization mode, and checking whether the SSA full flag is set to the state in which the SSA is not full, after extension of a supplementary spare area is performed, in a mode of verifying the extension of the supplementary spare area.

25. The method of claim 23, wherein the checking the number of entries in the SDL comprises:

checking whether the number of entries in the SDL is set to "0" in modes of initialization without certification, initialization with certification, reinitialization with certification and reinitialization with clearing a G2-list and the SDL, and checking whether the number of entries in the SDL is set to the number of remaining SDL entries which are not converted into the G2-list in a mode of reinitialization with SDL conversion.

26. The method of claim 19, wherein the checking the integrity of the SDL entries comprises:

checking whether byte positions indicating the integrity of the SDL entries and a spare area integrity are set to "FFh" indicating an un-used area since no information is supposed to exist in these byte positions, in modes of initialization without certification, initialization with certification, reinitialization with certification and reinitialization with clearing a G2-list and the SDL, and checking whether the byte positions indicating the integrity of remaining SDL entries and the spare area integrity are set to "FFh" indicating the un-used area since the integrity of SDL entries may include SDL entries which are not converted into the entries of the G2-list, and thus no information is supposed to exist in these byte positions, in a mode of reinitialization with SDL conversion.

27. A method of verifying whether defect management area (DMA) information is properly generated or updated in a recording and/or reproducing apparatus which records or reproduces information on and/or from an optical disc with the DMA information, the method comprising:

setting a test reference according to a test mode;

generating test information, from the DMA information which does not have any relation to actual defects, which is generated or updated by the recording and/or reproducing apparatus, according to the test mode; and executing a test for verifying the test information using the test reference in the reinitialization test mode.

28. The method of claim 27, further comprising:

obtaining a first test disc by forming known physical defects on a blank disc; and obtaining a second test disc by recording pre-fixed contents of a DMA in the first test disc, and recording a mirror file according to the test mode in the first test disc, and using the second test disc in generating the test information.

29. A method of verifying whether defect management area (DMA) information is properly generated or updated in a recording and/or reproducing apparatus which records or reproduces information on and/or from an optical disc with the DMA information, the method comprising:

generating test information from the DMA information, which has no relation to actual defects and which is generated or updated by the recording and/or reproducing apparatus, according to a test mode; and verifying the test information using a test reference for verifying the DMA information.

30. The method of claim 29, wherein the test information is a DMA mirror file.

31. A method of verifying whether a recording and/or reproducing apparatus reads and processes defect management area (DMA) information properly, comprising:

performing a process according to a test mode on a test disc containing predetermined defect information using the reproducing and/or recording apparatus to generate test information from the DMA information; and comparing the test information with reference test information to determine a verification of the recording and/or reproducing apparatus.

32. The method of claim 31, further comprising:

making known physical defects as the predetermined defect information at predetermined positions in a blank disc, to produce a first test disc;

obtaining a second test disc by recording pre-fixed contents of a DMA in the first test disc, and recording a mirror file according to the test mode in the first test disc;

having the recording and/or reproducing apparatus perform the process on the second test disc, to generate a second test disc with the DMA information; and reading the DMA information from the second test disc with the DMA information, to generate a test DMA mirror file as the test information;

wherein the reference test information is a reference DMA mirror file.

33. A method of verifying whether a recording and/or reproducing apparatus properly translates and processes defect information, the method comprising:

preparing a test disc having known physical defects and a test reference DMA mirror file according to a test mode;

generating test information based on having the recording and/or reproducing apparatus perform the test mode on the test disc; and conducting a verification test on the test information.

34. DMA information which is properly generated by a recording and/or reproducing apparatus using the process of:

performing a process according to a test mode on a test disc containing known physical defects and a test reference DMA mirror file using the reproducing and recording apparatus to generate the DMA information;

generating test information from the generated DMA information; and comparing the test information with reference test information to determine a verification of the recording and/or reproducing apparatus.

35. The DMA information of claim 34, wherein the comparing comprises checking a structure of a DMA, a disc definition structure (DDS) of the DMA, a primary defect list (PDL) structure end a secondary list (SDL) structure of the DMA, which form the test information.

* * * * *

UNITED STATES PATENT AND TRADEMARK OFFICE
CERTIFICATE OF CORRECTION

PATENT NO. : 6,845,473 B2
DATED : January 18, 2005
INVENTOR(S) : Jung-wan Ko et al.

It is certified that error appears in the above-identified patent and that said Letters Patent is hereby corrected as shown below:

Column 12,
Line 63, change "discs" to -- disc --.

Column 18,
Line 30, change "end" to -- and --.

Signed and Sealed this

Twenty-first Day of June, 2005

JON W. DUDAS
*Director of the United States Patent and Trademark Office*